Sept. 3, 1940.  L. G. SYMONS  2,213,773
MEANS FOR SUPPORTING AND TENSIONING SCREEN CLOTH
Filed Jan. 17, 1938  3 Sheets-Sheet 1
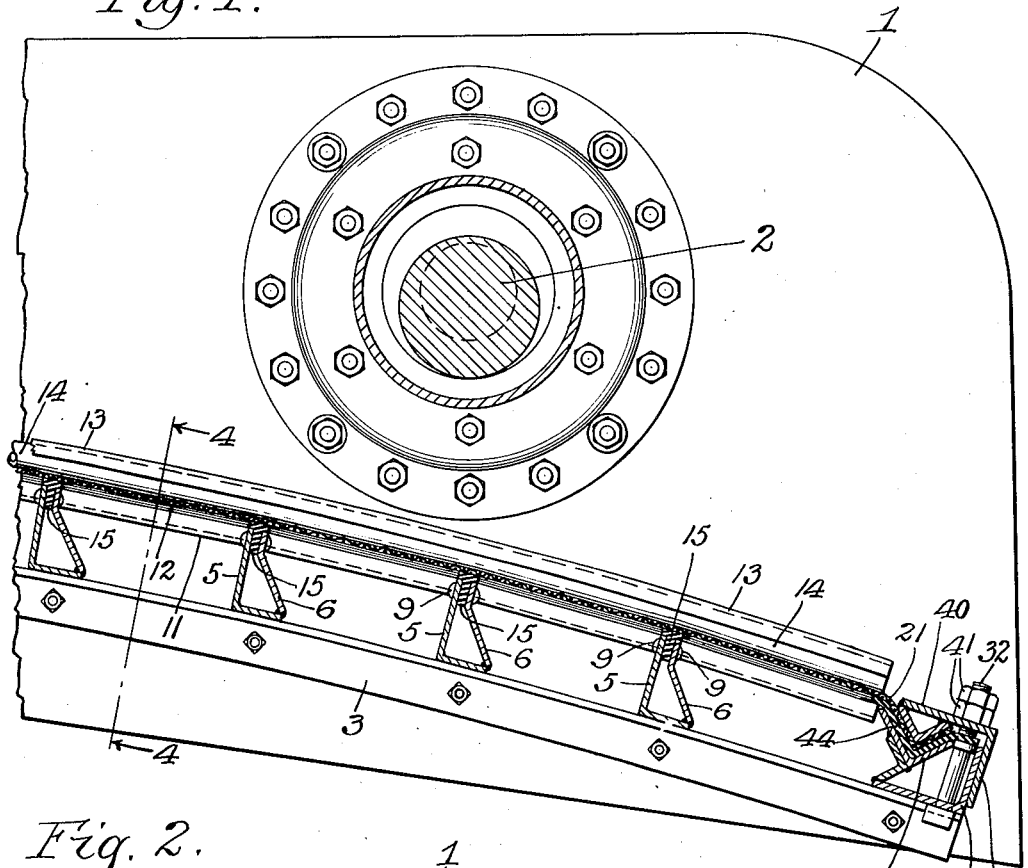
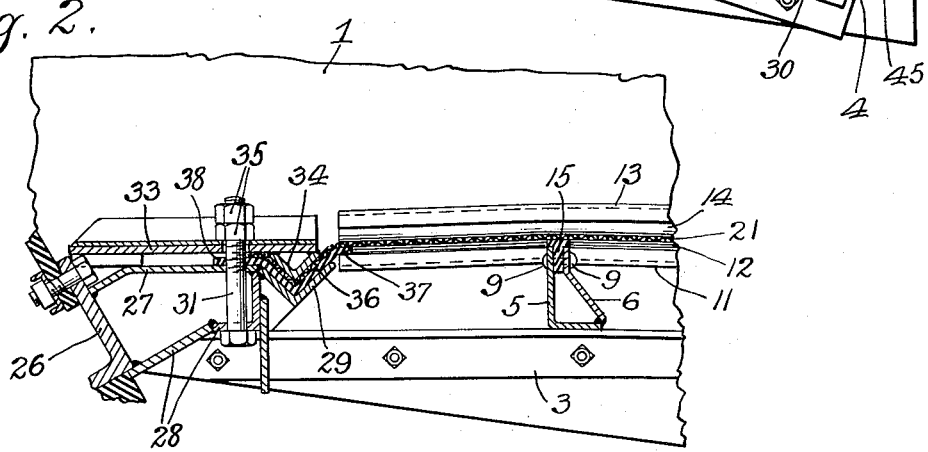
Inventor
Loren G. Symons.
By Parker & Carter
Attorneys.

Sept. 3, 1940.  L. G. SYMONS  2,213,773
MEANS FOR SUPPORTING AND TENSIONING SCREEN CLOTH
Filed Jan. 17, 1938  3 Sheets-Sheet 2
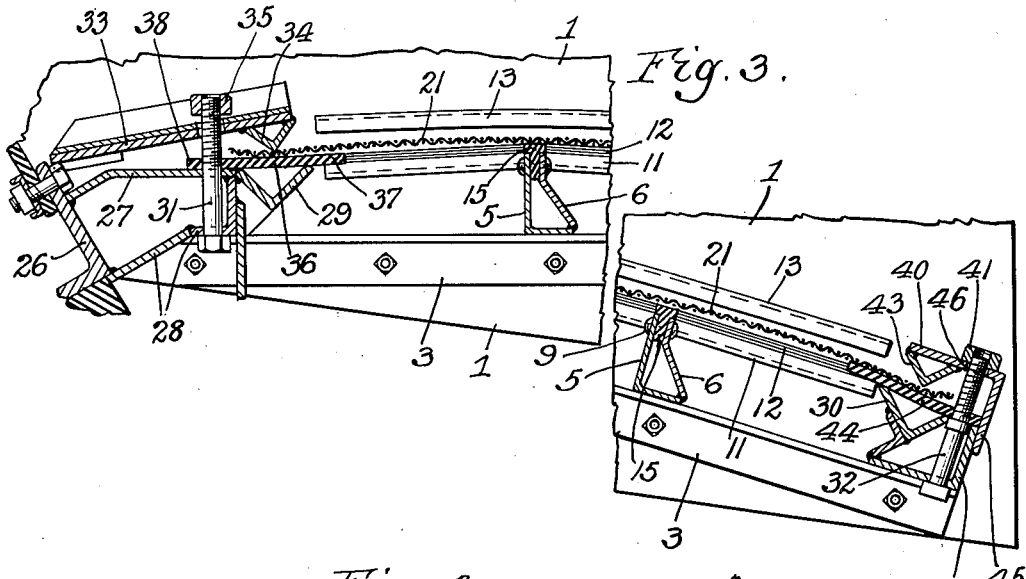
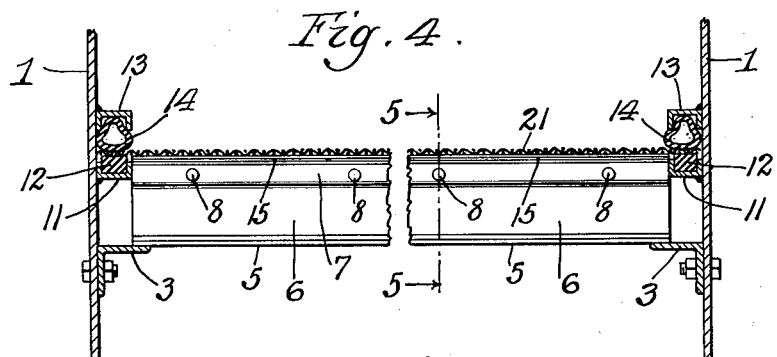
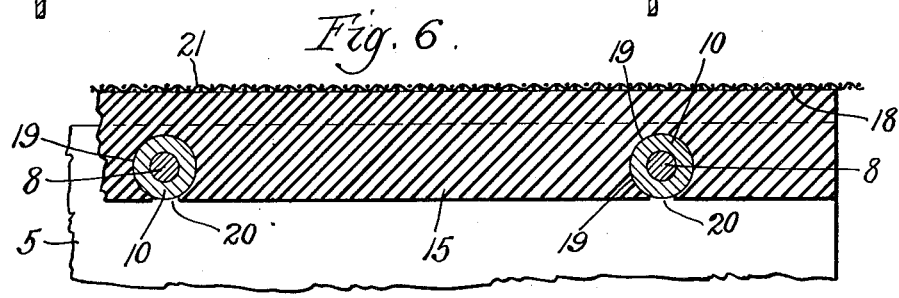
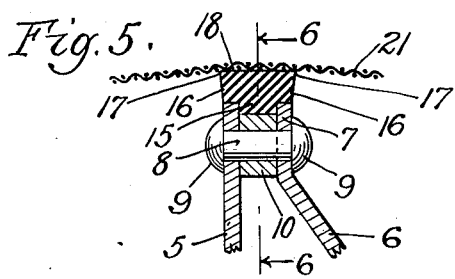
Inventor
Loren G. Symons
by Parker & Carter
Attorneys.

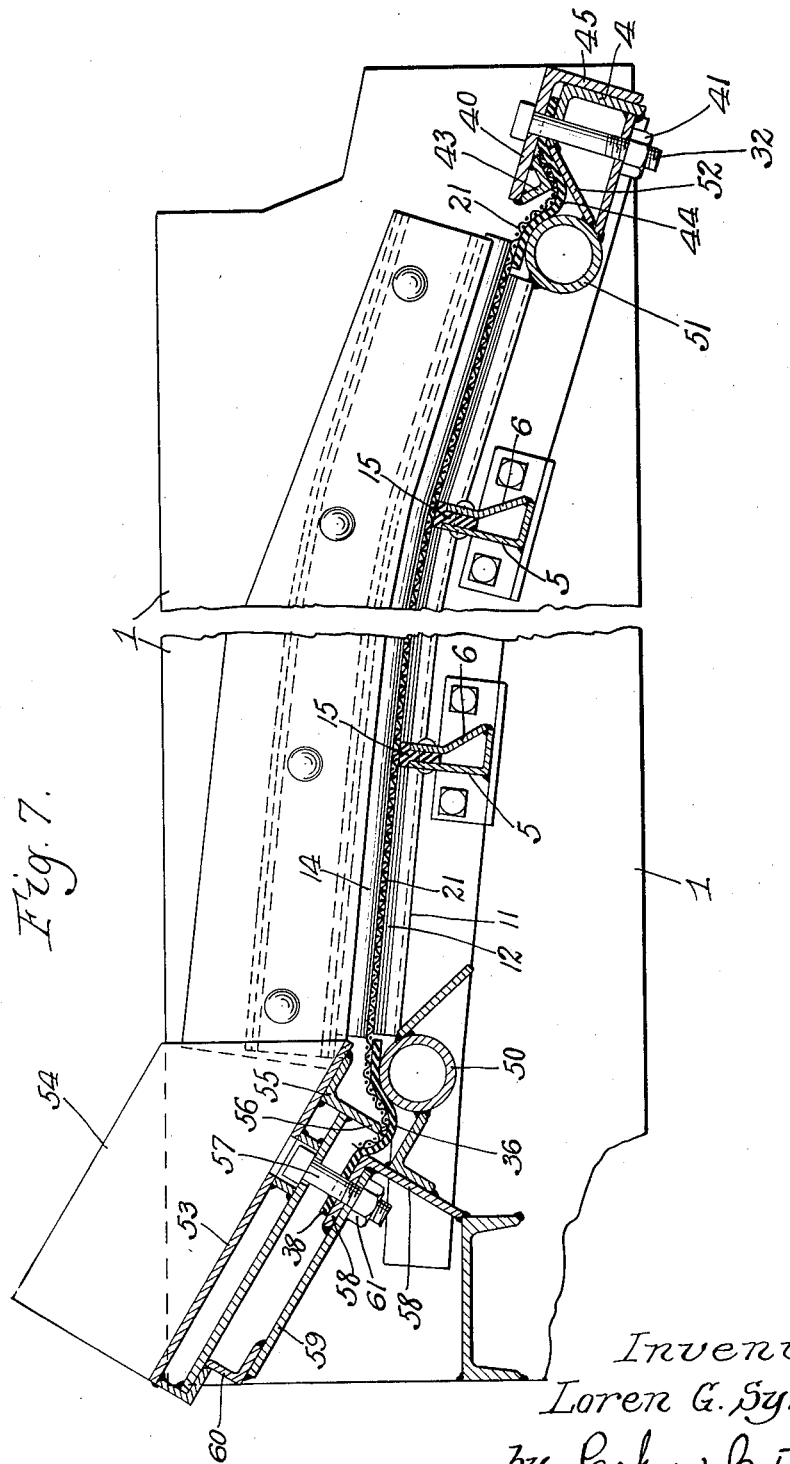

Patented Sept. 3, 1940

2,213,773

UNITED STATES PATENT OFFICE 2,213,773

MEANS FOR SUPPORTING AND TENSIONING SCREEN CLOTH

Loren G. Symons, Hollywood, Calif., assignor to Nordberg Manufacturing Company, Milwaukee, Wis. a corporation of Wisconsin Application January 17, 1938, Serial No. 185,330

14 Claims. (Cl. 209—403)

My invention relates to an improvement in screening means and has for one purpose the provision of improved means for holding and tensioning screen cloth.

Another purpose is the provision of improved means for supporting the cloth itself and for preventing wear of the cloth.

Another purpose is the provision of readily removable securing means whereby the screen cloth can be applied to and removed from the screen structure at maximum speed and with minimum trouble.

Another purpose is the provision of supporting means for screen cloth which will substantially increase the life of the cloth.

Other purposes will appear from time to time in the course of the specification and claims.

This application is in part a continuation of my copending application, Serial No. 132,276, filed March 22, 1937, and in part a continuation of my copending application Serial No. 159,644, filed August 18, 1937.

I illustrate my invention more or less diagrammatically in the accompanying drawings wherein:

Figure 1 is a vertical longitudinal section through the end of a screen showing the screen cloth locked in position;

Figure 2 is a similar view of the opposite end of a screen;

Figure 3 is a view showing the ends of the screen prior to the locking of the cloth in position;

Figure 4 is a section on the line 4—4 of Figure 1;

Figure 5 is a detail section on the line 5—5 of Figure 4 on an enlarged scale through an individual intermediate screen cloth support;

Figure 6 is a section on the line 6—6 of Figure 5; and

Figure 7 is a vertical longitudinal section illustrating a variant form of means for securing the screen cloth in position.

Like parts are indicated by like symbols throughout the specification and drawings.

Referring to the drawings, 1 generally indicates any suitable side frame member of a screen frame. 2 generally indicates an unbalanced eccentric adapted for vibrating the screen but since the details of the vibrating means do not of themselves form part of the present invention it is not described or shown in detail.

3, 3 are angle members extending along the inner faces of the screen frame members 1, 1. 4 is a transversely extending angle member associated with the members 3 and extending between the members 1. 5, 5 are transversely extending angle members intermediate the ends of the members 1 and 3 and extending therebetween. Secured thereto are additional transverse members 6 having upper end portions 7 parallel with the upper edges of the members 5. The upper edge portions 5 and 7 are secured together as by rivets 8 headed as at 9 and surrounded if desired by bushings or spacers 10. It will be understood that the composite transverse structure so formed is preferably fixed in relation to the side frame members 1 and the angles 3. Positioned above the angles 3 are upwardly open channels 11, 11 which may receive strips 12 of rubber or the like.

Positioned above the channels 11 are the downwardly open channels 13, 13 in which may be positioned hollow tubes 14, 14 of rubber or the like. The channels 11 and 13 are so spaced apart that the rubber tubes 14 can be inserted or removed fairly readily but cannot unintentionally escape.

Positioned between the members 5 and 7 are strips of rubber or the like 15, each such strip having laterally enlarged upper portions 16 preferably having sharp corners 17 and a generally horizontal or if desired slightly convex upper face 18. The strips 15 being of flexible material can readily be slipped on and off the bushings 10 and are provided with apertures 19 conforming thereto and open at the bottom as at 20, whereby by lifting up on one end of the strip, the strip may be readily removed when desired at times when no screen cloth is in position to hold it in place.

21 indicates any suitable screen cloth or mesh herein shown as extending from end to end of the screen. It will be understood that when the screen cloth 21 is in place it rests upon the upper faces 18 of the members 15 and at its edges is gripped between the rubber pads 12 and the rubber tubes 14. It will be understood that when I employ the term "rubber" in the specification or claims I wish to include any other substance having the equivalent characteristics for the purpose of the present application.

26 generally indicates any suitable transverse end member for the screen which may have associated therewith an upper plate 27 and a lower plate 28. At each end of the screen I illustrate an upwardly concave member 29, 30, each such member being shown in Figure 3 and in Figures 1 and 2 as an upwardly concave angle member. The details of the shape and proportions may be widely varied, however, and the angle members shown in the said figures are merely examples of practical structures. Screw-threaded pins or guides 31, 32 are shown at the opposite ends of the screen. The members 31 extend upwardly through the plates 27 and 28. The members 32 extend upwardly through the bottom flange of the angle 4. Positioned at the upper or feed end of the screen shown at the left of Figure 3 I illustrate a clamping plate 33 having a downwardly convex channel member 34 conforming generally to the shape of the members 29. 35 are locking nuts on the members 31 whereby the plate 33 and the member 34 may be clamped down into the position in which they are shown in Figure 2.

36 indicates a mat of rubber or other flexible, frictional material. The end or edge 37 is free to move whereas the end 38 is threaded upon the members 31. The edge of the screen cloth 21 is superposed upon a rubber member 36 but terminates short of the member 31. It will be understood, therefore, that when the nuts 35 are downwardly moved into locking position the member 34 bends the end edge of the mesh 21 and holds it firmly against the rubber mat 36 during this bending process until the parts are finally firmly clamped together as shown in Figure 2.

The frictional characteristics of the rubber are sufficient to put as much tension on the mesh as it will stand without tearing. However, it will give more or less as the parts are moved down into the locking position of Figure 2 and in practice the result is a very firm clamping of the mesh end without however any tearing or weakening of the mesh. The securing means for the opposite end of the mesh is herein shown as working in substantially the same way although it will be understood that I may if desired employ other locking means for the opposite end of the mesh and apply the herein shown locking means to one end only of the mesh. However, since various means for locking or clamping or securing the edge or end of a mesh are familiar, I do not herein illustrate such other locking means.

It is preferable to apply my locking means to both ends of the mesh. I therefore show in Figure 3 an angle member 40 which is urged downwardly by the locking nut 41 on the members 32 in such fashion that the downwardly convex angle 43 is thrust against the rubber mat 44 to lock the lower or discharge end of the screen as shown in Figure 1. I find it advisable to provide a guiding flange 45 for the plate 40 which may extend outside of the transverse member 4. The member 40 is provided with an aperture 46 whereby it may be threaded upon the members 32.

As illustrating one of many possible variations, I show in Figure 7 transverse tubular supports 50, 51 for the opposite ends of a screen. In the place of the angle 30 for the discharge end of the screen as shown in Figures 1 and 3, I show an inclined plate 52 against which the inverted angle 43 and the plate 40 may be drawn. At the feed end of the screen I may make the means for securing the mesh unitary with the feed spout structure which includes the floor 53 and side walls 54. Secured to the floor 53 is the angle 55, the lower flange 56 of which engages the upper face of the edge of the mesh or screen cloth 21 and thrusts it downwardly against the rubber mat 36, drawing the two members over the upper arcuate face of the transverse member 50.

57 is any suitable screw-threaded securing member extending downwardly from the above described feed spout structure and passing through the end 38 of the rubber mat 36, the transversely extending frame angle 58 and the plate 59 associated therewith. At the upper edge of the plate 59 is an angle 60 upon which a portion of the feed chute structure rests. The lower or inner end of the feed spout structure, however, is drawn downwardly into locking position by rotation of the nuts 61 and the result is the locking of the parts in the position in which they are shown at the left end of Figure 7.

It will be realized that whereas I have herewith shown and described a practical operative device, nevertheless many changes might be made in the size, shape, number and disposition of parts without departing from the spirit of the invention and I wish, therefore, that my showing be taken as in a sense diagrammatic.

The use and operation of my invention are as follows:

The tensioning means described, including the opposed concave and convex members 29 and 34, 30 and 43 and the intervening rubber pads 36 and 44 cause the ends of the screen to pull the screen cloth longitudinally sufficiently powerfully to impart adequate tension. The parts are so proportioned that it is impossible to pull the cloth taut enough to break the wires in the cloth, but the tension is sufficient to prevent any sagging or bagging between supports. No special fastening of any kind is required and the screen cloth or mesh is simply cut to the desired length. No clamping or locking members pass through the screen cloth and the screen cloth cut to size is simply laid on the screen deck and subjected to the above described clamping action. Since no bolts pass through holes in the mesh but since the securing members 31 and 32 or their equivalent do pass through the ends of the rubber mats 36, 44, all that is necessary to apply a new screen cloth is to cut a stretch to the proper length and then lay it in place and tighten up the locking nuts.

In order to hold down the edges of the screen and to prevent liquid from running down the sides or over the rubber pads 12 I provide the inverted channels 13 in which the rubber hose 14 is positioned which serves as leakage preventing means.

In applying the clamping means as the upper convex members move farther and farther down toward locking position, the locking or gripping effect distorts or bends the rubber mats and the edge of the screen cloth together. As the rubber and the cloth are bent or flexed, the bending causes a relatively tight frictional locking or tensioning effect and the screen begins to be drawn out towards full tension. As the locking members are moved farther and farther down toward locking position, this locking or gripping effect becomes increasingly great and finally is great enough to put a very strong tension upon the mesh, a tension sufficient for screening purposes and sufficient to hold the mesh thoroughly tight. The fact that the screen cloth with the rubber mats 36, 44 is bent around a V at the bottom of the members 34 or 43 increases the frictional locking effect progressively as the locking members are downwardly moved.

However, since the mesh is not actually gripped by any positive metal to metal clamping means it cannot be broken or torn because the individual wires are strong enough to draw or slip around the lower edge of the locking members and thereby prevent breakage. In other words, I provide an automatic tensioning device which is sufficiently powerful to put any desired tension on the mesh but which is not strong enough to break the individual strands of the mesh or to tear the mesh. This does away with the human element of breaking the cloth by undue tightening which is so common in other types of screens.

A further advantage of my invention consists in the fact that I provide rubber supporting means for the intermediate portions of the mesh. The members 5, 6 are so arranged as in effect to constrain the screen cloth to a species of arc so that when tension is applied to one or both ends of the screen mesh the mesh as a whole is tensioned firmly in relation to each one of the supporting members 16. I find it advisable in most cases to use a very soft rubber for the members 16 or some substance which can be very substantially compressed under this tension. For example, I may employ a sponge rubber. I also prefer to have this rubber in the form of a sharp edged block or transversely extending member and find that when the tension of the screen cloth 21 is fully on, the mesh or cloth is drawn down into the rubber and the soft rubber of the member 16 penetrates up into the apertures of the mesh. This is highly advantageous as making it impossible for small particles to penetrate between the mesh and the supports 16 as is the case when a harder substance is used and especially when oval or rounded supports are employed. I find in practice that the life of the screen cloth is increased to a very substantial extent by the employment of a soft yielding material into which the screen cloth in effect becomes imbedded. The sharp edges 17 assist materially in preventing the penetration of particles between the supports 16 and the screen cloth. Wherever possible the soft yielding material should be molded with openings or grooves to receive any steel parts exposed to the action of the abrasive material which is being screened and where this yielding material closes over the steel portion, I find it desirable to leave a sharp edge so as to discourage the entrance of such abrasive material.

It will be observed that the screen cloth 21 is constrained to a generally arcuate position, as shown for example in Figure 7, being drawn over the series of intermediate supports carrying the pads or rubber members 15. This arcuate disposition of the supports assures that the screen cloth when tensioned will be drawn firmly against and into the surface of each one of the yielding members 15.

I claim:

1. In a screen frame, side frame members, a plurality of transverse supports extending between said side frame members, a screen cloth and means for tensioning it across said supports, and additional means for engaging the edges of the screen cloth along said side frame members including inverted channel members extending along the inner faces of said side frame members and overlying the edges of said screen cloth, and yielding compressible tubular closure members interposed between said channel members and the edge of the screen cloth.

2. In a screen frame, side frame members, a plurality of transverse supports extending between said side frame members, a screen cloth and means for tensioning it across said supports, and additional means for engaging the edges of the screen cloth along said side frame members including inverted channel members extending along the inner faces of said side frame members and overlying the edges of said screen cloth, and flexible tubular members of yielding material interposed between said channel members and the edge of the screen cloth.

3. In a screen, a plurality of generally parallel transversely extending supports including a flat topped member of yielding material extending transversely of the screen, said supports being located at a variety of levels in relation to a plane extending from end to end of the screen, screen cloth resting thereon, and means for constraining said screen cloth to generally arcuate position with the edges of each said flat topped member firmly pressed into the mesh of the screen cloth, each side of each said flat topped member terminating in a relatively sharp corner adapted, in response to the arcuate configuration of the tensioned screen cloth, to sink substantially into the mesh of said cloth.

4. In a screen, transverse supporting members, including laterally spaced elements, securing members connecting said laterally spaced elements, rubber mesh engaging elements inserted into the space between said laterally spaced elements, said rubber mesh engaging elements each including a downwardly extending element apertured to embrace and partially underlie said securing members and a body of screen mesh overlying said rubber element, and means for tensioning it.

5. In a screen, in combination, a screen deck, screen mesh mounted on said deck, and means for tightening said mesh, including a flexible sheet of flexible material in contact with the end of said mesh, and means for simultaneously transversely bending said sheet and the contacted portion of said mesh, while they are in contact over a substantial area, and for thereby locking said sheet and mesh in tensioning relationship, the engagement between the mesh and the flexible material constituting the sole means for securing the mesh against movement.

6. In tensioning means for screen mesh, a clamp for the edge of the screen mesh including a concave and a convex member, and means for thrusting them together into clamping relationship, a flexible friction member positioned between said convex and concave member, one edge thereof being held against movement in relation to the clamp, the rest of said frictional member being free to move in relation to said clamp, the edge of the screen mesh being held between said flexible friction member and one of the clamp members, and being free to move in relation thereto in response to a predetermined excess tension.

7. In a screen, a transverse supporting member including laterally spaced and downwardly diverging elements, securing members connecting said laterally spaced elements, a yielding member penetrating into the space between said elements and including a downwardly extending element apertured to embrace and partially underlie said securing members, and a body of screen mesh overlying said element and means for tensioning it.

8. In a screen, a plurality of transverse supports each including a sharp-cornered member of yielding material extending transversely of the screen, screen cloth resting thereon, and means for tensioning said screen cloth against said members and for thereby sinking the screen cloth into the sharp edges of said members, with the entire area of said members firmly pressed into the mesh of said screen cloth, said members being arranged in a generally arcuate relationship whereby the screen cloth is properly tensioned against all of said intermediate members between the ends thereof.

9. In a screen, a screen frame and means for vibrating it, a screen cloth and means for supporting it on said frame, means for tensioning said screen cloth including a clamping member adjacent one end of the frame, having a concavity and an opposed clamping member having a projecting portion adapted to penetrate said concavity, means for drawing two clamping members together against opposite faces of the screen cloth, the edge of the screen cloth being free, and a blanket of yielding compressible material having a free edge overlying the edge portion of the screen and adapted to be flexed and compressed with said screen in response to the clamping movement of the opposed clamping members.

10. In a screen, a screen frame and means for vibrating it, a screen cloth and means for supporting it on said frame, means for tensioning said screen cloth including a clamping member adjacent one end of the frame, having a concavity and an opposed clamping member having a projecting portion adapted to penetrate said concavity, means for drawing two clamping members together against opposite faces of the screen cloth, the edge of the screen cloth being free, and a blanket of yielding compressible material having a free edge overlying the edge portion of the screen and adapted to be flexed and compressed with said screen in response to the clamping movement of the opposed clamping members, the opposed clamping portions of the gripping members conforming generally to each other.

11. In a screen, a screen frame and means for vibrating it, a screen cloth and means for supporting it on said frame, means for tensioning said screen cloth including a clamping member adjacent one end of the frame, having a concavity and an opposed clamping member having a projecting portion adapted to penetrate said concavity, means for drawing two clamping members together against opposite faces of the screen cloth, the edge of the screen cloth being free, and a blanket of yielding compressible material having a free edge overlying the edge portion of the screen and adapted to be flexed and compressed with said screen in response to the clamping movement of the opposed clamping members, and a feed plate unitary with the upper of said clamping members and movable therewith, said feed plate being substantially inclined to the plane of the feed end of the screen.

12. In supporting means for screen mesh, an elongated member, of yielding material, of generally T-shaped cross section, including an upper and transversely extending mesh-engaging portion having a generally plane upper face and relatively sharp corners along each longitudinal edge thereof, and a downwardly depending web portion located intermediate the edges of the lower side of said upper portion, said web portion having in the lower edge thereof generally horizontal transversely extending recesses of generally arcuate interior form, the lower openings of said recesses being of less width than the upper portions.

13. In supporting means for screen mesh, an elongated member, of yielding material, of generally T-shaped cross section, including an upper and transversely extending mesh-engaging portion having a generally plane upper face and relatively sharp corners along each longitudinal edge thereof, and a downwardly depending web portion located intermediate the edges of the lower side of said upper portion, said web portion having in the lower edge thereof generally horizontal transversely extending recesses of generally arcuate interior form, the lower openings of said recesses being of less width than the upper portions, the arc defining said recesses being more than 180° and less than 360°.

14. In supporting means for screen mesh, an elongated member, of yielding material, of generally T-shaped cross section, including an upper and transversely extending mesh-engaging portion having a generally plane upper face and relatively sharp corners along each longitudinal edge thereof, and a downwardly depending web portion located intermediate the edges of the lower side of said upper portion, said web portion having in the lower edge thereof generally horizontal transversely extending recesses of generally arcuate interior form, the lower openings of said recesses being of less width than the upper portions, said recesses being formed to define each a cylinder with a lower portion of the wall broken away.

LOREN G. SYMONS.